United States Patent
Cohen

(10) Patent No.: US 7,091,973 B1
(45) Date of Patent: Aug. 15, 2006

(54) APPARATUS AND METHOD FOR ESTIMATING REFLECTED RADIANCE UNDER COMPLEX DISTANT ILLUMINATION

(76) Inventor: Jonathan Michael Cohen, 3975 Meier St., Apt. 102, Los Angeles, CA (US) 90066

( * ) Notice: Subject to any disclaimer, the term of this patent is extended or adjusted under 35 U.S.C. 154(b) by 362 days.

(21) Appl. No.: 10/600,550

(22) Filed: Jun. 20, 2003

(51) Int. Cl.
*G06T 15/50* (2006.01)

(52) U.S. Cl. .................................................... 345/426
(58) Field of Classification Search ................ 345/423, 345/426, 421, 589
See application file for complete search history.

(56) References Cited
U.S. PATENT DOCUMENTS 6,697,062 B1 * 2/2004 Cabral et al. ............... 345/419
2003/0011596 A1 * 1/2003 Zhang et al. ............... 345/426
2003/0128207 A1 * 7/2003 Sawada ....................... 345/419

* cited by examiner

*Primary Examiner*—Kimbinh Nguyen
(74) *Attorney, Agent, or Firm*—Blakely Sokoloff Taylor & Zafman LLP

(57) ABSTRACT

An apparatus and method for estimating reflected radiance under complex distant illumination are described. In one embodiment, an importance sampling estimator is used with a novel piecewise constant importance function that effectively concentrates ray samples where energy is likely to be found. To properly account for the effects of a visibility term in the shading calculation, in one embodiment, a shadow cache is provided which caches information indicating ray directions that are occluded or unoccluded from a point in space. Accordingly, by concentrating hemispheric samples where the light source is likely to be strongest, a reflected radiance integral is efficiently computed and estimated in a real-world lighting situation.

58 Claims, 12 Drawing Sheets

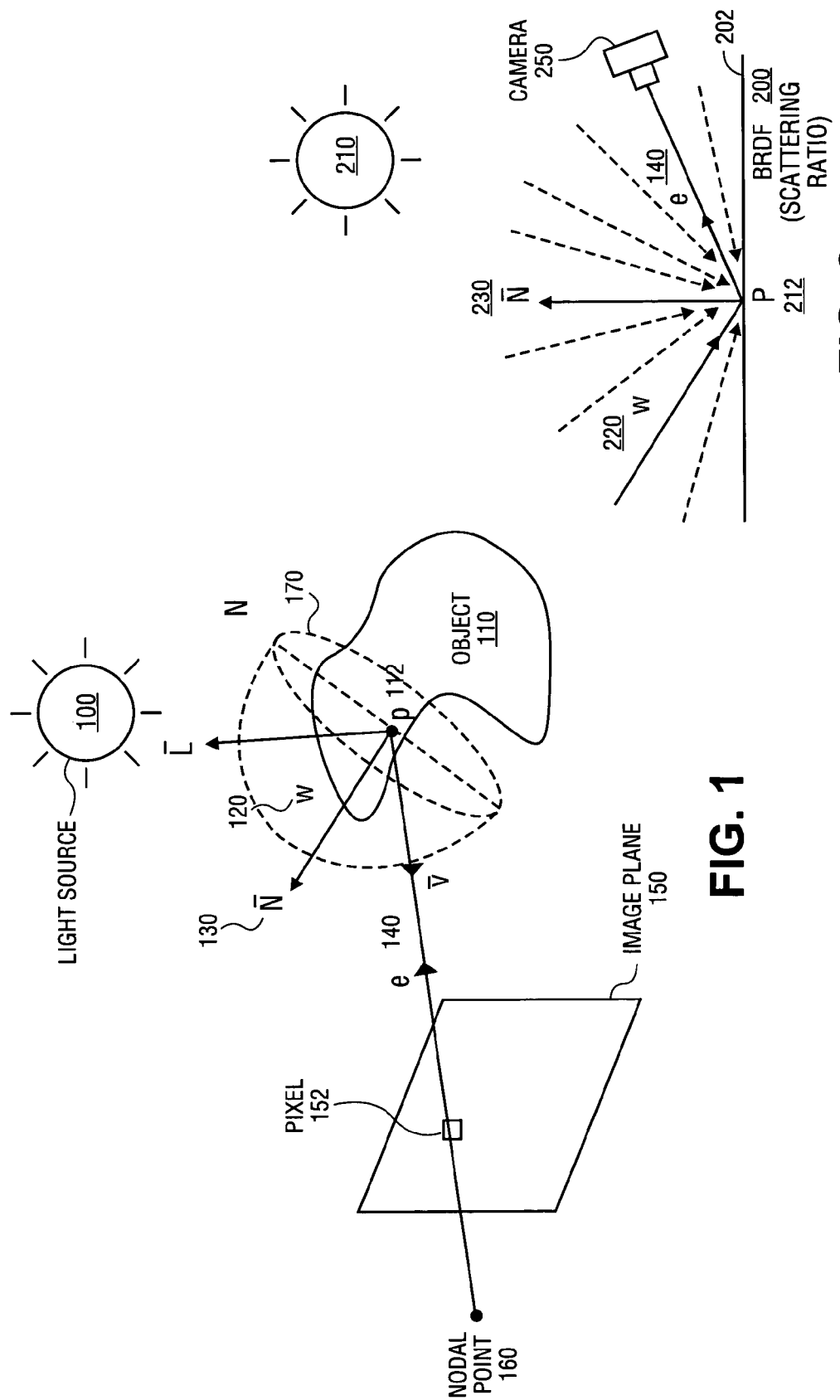

510

THE LOCATIONS OF 1000 RAY SAMPLES CHOSEN ACCORDING TO $\hat{h}$

500

THE "GRACE" ENVIRONMENT MAP

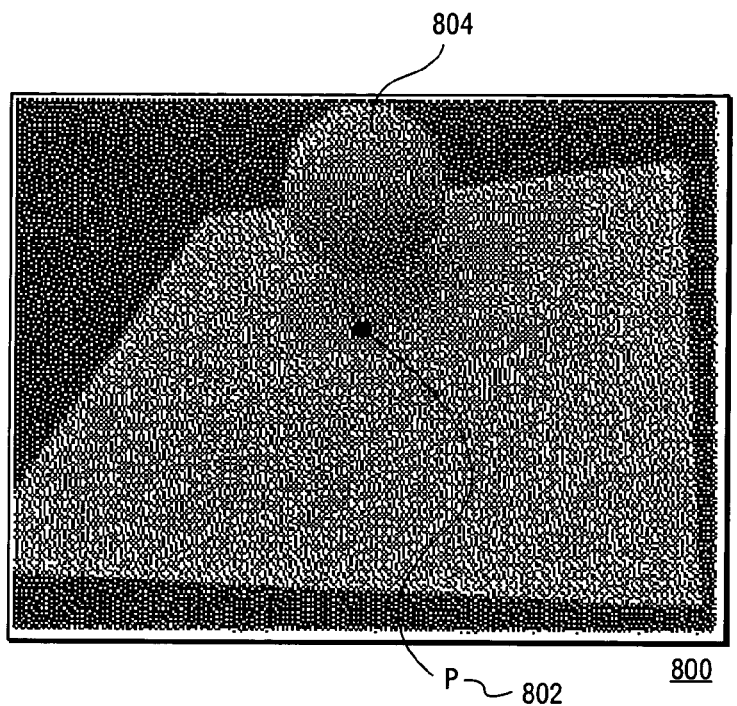
FIG. 10A
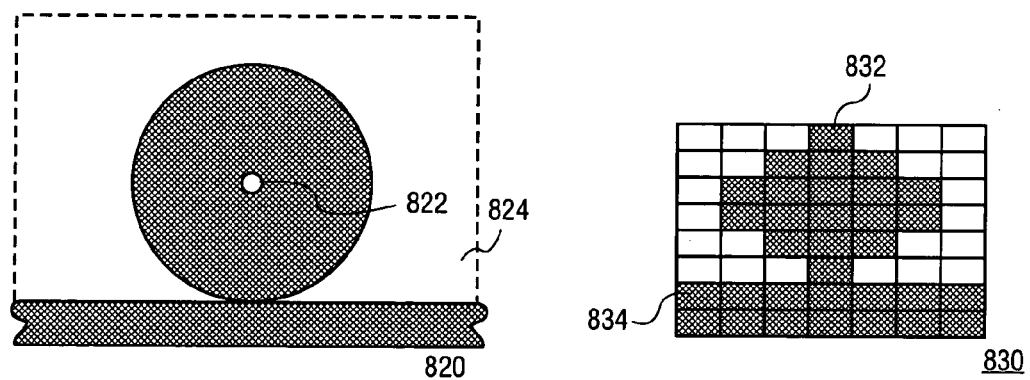
FIG. 10B  FIG. 10C

APPARATUS AND METHOD FOR ESTIMATING REFLECTED RADIANCE UNDER COMPLEX DISTANT ILLUMINATION

FIELD

One or more embodiments of the invention relate generally to the field of computer graphics, specifically global illumination. More particularly, one or more of the embodiments of the invention relates to a method and apparatus for estimating reflected radiance under complex distant illumination.

BACKGROUND

In computer graphics rendering is a process of generating digital data that represents the projection of a three dimensional scene onto a two dimensional image plane in order to simulate the recording of the scene by, for example, a camera. The digital data generally represents the projection of surfaces of objects in a three dimensional scene, illuminated by one or more light sources, onto the two dimensional image plane. The two dimensional image is in the form of an array of picture elements (pixels). The rendering process may utilize a geometric model that specifies the position, shape and color of objects and light sources in a world space.

One approach to rendering is a two stage process comprised of a geometry stage and a rendering stage. In the geometry stage a data base of geometric descriptions of objects and light sources (the geometric model) is transformed from a world coordinate system (object space) into a view dependent coordinate system (screen space) taking into account a view point and view surface. The view point is a point in the object space from where the objects are being viewed to obtain the image. The view surface is the surface in the world space that corresponds to the screen space.

In the rendering stage, once the positions of the objects and the screen space are determined, each pixel is colored (assigned a color comprised of, typically, non-negative red, green, and blue values) depending on which objects are occluded or visible. Accordingly, color rendering is performed by determining which objects are visible from the view point within the bounds of the view surface and then determining the color of the light that is emitted or reflected from the visible objects in the direction of the view point.

A common rendering task in feature film visual effects is to integrate computer generated elements with a live action background. The computer generated (CG) elements or models range from organic characters animated via complex physical models to static objects like buildings or vehicles. Often, all of the light in the scene emanates from outside the object, and the object passively reflects incident radiance toward the camera. This process, called Image-based lighting (IBL), involves illuminating the CG elements (scene database) with images of light from the real world. IBL evolved from a reflection mapping technique in which panoramic images are used to texture maps on computer graphics models to show objects reflecting real or synthetic environments. In practice, these IBL renderings are frequently achieved using a number of heuristic techniques, mostly requiring labor intensive setup and tweaking by digital artists.

As computers get faster and global illumination algorithms improve, there is an increasing desire to calculate such "outside-in" image-based lighting situations using global illumination. One step in many global illumination algorithms is to compute, at a surface point, the radiance reflected toward some direction due to direct illumination (i.e., photons that have traveled directly from the light source to the surface, without having been reflected in between).

Generally, the contributions of the light reflected from the various surfaces in a scene to a pixel's value (representing the color and intensity of that pixel) are expressed in the form of one or more integrals equations, for example the Kajiya Rendering Equation. In particular, the reflected radiance integral describes the amount of light energy (radiance) reflected directly from a light source to a pixel's location on the view surface. This is the fundamental quantity that physically-based computer graphics rendering algorithms compute.

The integrand of the reflected radiance integral is the product of three functions, L, $f_r$, and $V_p$, where L depends on the position, intensity, and output characteristics of light sources, $f_r$ (the bi-directional reflectance distribution function, or BRDF) depends on reflectance properties of the scene surfaces, and $V_p$ (the visibility function) depends on the geometry of the scene. Since the reflected radiance integral will generally not have a closed form solution, numerical methods are used to evaluate it in order to generate pixel values. Typically, exact Monte Carlo methods or approximate methods have been used in computer graphics to numerically evaluate the reflected radiance.

Approximate methods are usually very fast but compute only an approximate value for reflected radiance. Therefore, they usually require significant additional hand tuning in order to obtain a visually realistic final rendered image. Exact algorithms have the property that if the algorithm runs for a long time, it is guaranteed to eventually yield arbitrarily low error. In other words, exact algorithms eventually converge to the correct solution, whereas this is not necessarily true for approximate algorithms. For this reason, exact algorithms are often preferred for high-end computer graphics applications. The most common exact method for computing reflected radiance under an environment map light source is Monte Carlo or Quasi-Monte Carlo BRDF weighted importance sampling.

In general, importance sampling estimates the value of an integral by sampling the integrand where it is likely to have the most energy, as specified by an importance function. In BRDF importance sampling, hemispherical samples are chosen relative to an importance function that weighs a particular direction of the hemisphere proportional to the value of the BRDF in that direction. For example, let $f_r(\omega,n,\omega')$ be a BRDF that measures the amount of energy scattered from direction $\omega$ to direction $\omega'$ at surface point p with normal n. To evaluate reflected radiance in direction $\omega$ from surface point p with surface BRDF $f_r(\omega,n,\omega')$, the importance function $I(\omega')$ is chosen proportional to $f_r(\omega,n,\omega')$ (since n and $\omega$ are fixed, this is a function of $\omega'$).

When $f_r$ is a Lambertian or Phong BRDF, methods exist for transforming samples drawn uniformly from the unit square into samples drawn according this importance function over the hemisphere. Samples over the unit square are drawn using independent uniform sampling, stratified sampling, or a Quasi-Monte Carlo low-discrepancy point sequence (such as the Halton sequence). These sample points are transformed to the hemisphere, and the resulting hemispherical directions are used as sample points in the standard importance-sampling estimator, weighted inversely proportional to the importance function $I(\omega')$.

Unfortunately, the method of BRDF-based importance sampling used to evaluate the reflected radiance integrals has sub-optimal efficiency. This is because light source output L and scene visibility $V_p$ may contribute significant energy to the reflected radiance integrand, but are ignored when placing random samples according to only the BRDF. When applied to complex real-world lighting situations, such as, for example, image-based lighting, BRDF-weighted importance sampling often misses the important features of the integrand and hence will require an enormous number of samples in order to compute an accurate image. Alternate importance sampling techniques take the light source L into account when placing samples, but ignore the effects of the scene visibility $V_p$ and surface reflectance $f_r$.

BRIEF DESCRIPTION OF THE DRAWINGS

The various embodiments of the present invention are illustrated by way of example, and not by way of limitation, in the figures of the accompanying drawings and in which:

FIG. 1 is a block diagram illustrating reflected radiance of a point in an object space illuminated by a light source.

FIG. 2 is a block diagram illustrating a bi-directional radiance distribution function (scattering ratio) experienced at a camera based on a direction ω and an I/O ray between the point and the camera.

FIGS. 10A–10C are drawings illustrating an occlusion image for determining visibility, in accordance with one embodiment of the invention.

DETAILED DESCRIPTION

Figure 3:
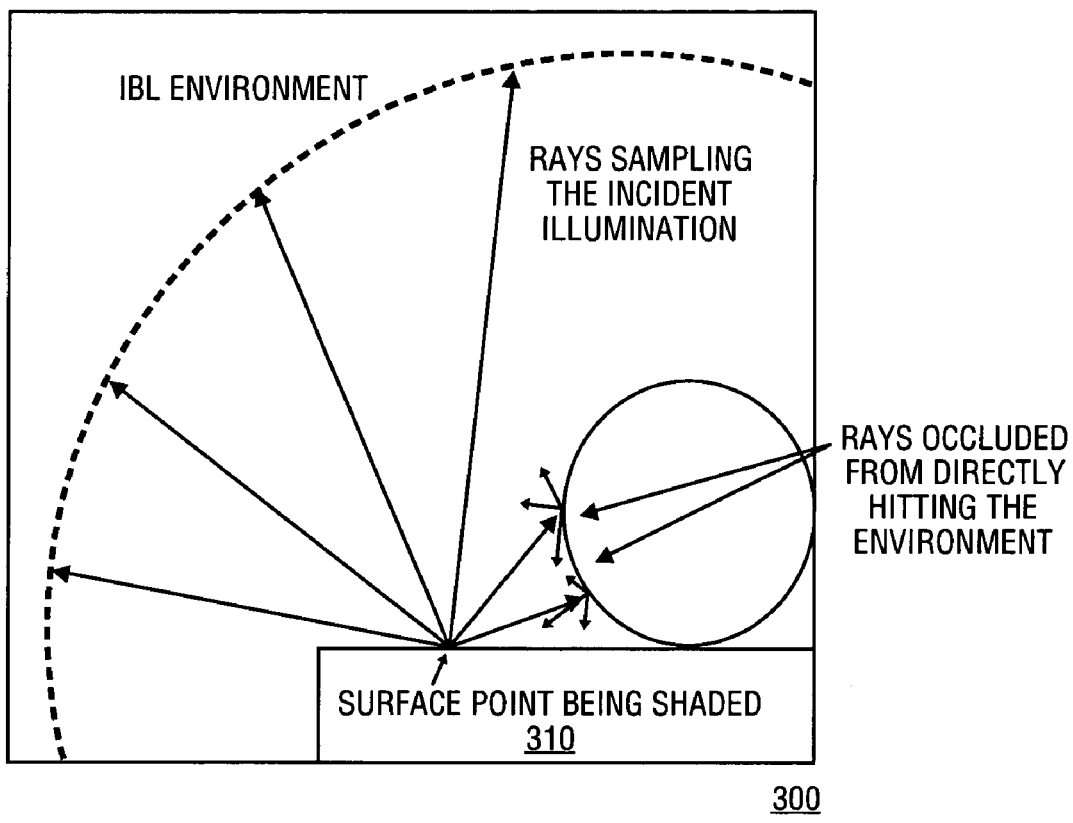
FIG. 3 is a block diagram illustrating a sphere of incident illumination for image-based lighting, as known in the art.

A method and apparatus for estimating reflected radiance under complex distant illumination are described. In one embodiment, the method includes estimating reflected radiance under complex distant illumination, such as image-based lighting (IBL). Accordingly, a reflected radiance integral is efficiently computed in the case where incident light has a high variation as found in real-world lighting situations, such as outdoors or on a cinematic set. In one embodiment, an unbiased Monte Carlo technique is provided for estimating the value of reflected radiance at a surface point due to a hemisphere of direct distant illumination.

In one embodiment, an importance sampling estimator is used with a novel piecewise constant importance function that effectively concentrates ray samples where energy is likely to be found. To properly account for the effects of a visibility term in the reflected radiance calculation, in one embodiment, a shadow cache is provided which caches information indicating ray directions that are occluded or unoccluded from a point in space. Accordingly, by concentrating hemispheric samples where the light source is likely to be strongest, a reflected radiance integral is efficiently computed and estimated in a real-world lighting situation. In one embodiment, the described techniques are implemented in a shader of an offline rendering system.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logical. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM," flash memory), a floppy diskette, an optical disk (e.g., compact disk or digital video disk "DVD"), a hard drive disk, tape, or the like. In one embodiment, the present invention may be provided as an article of manufacture which may include the machine or computer-readable medium having stored thereon instructions which may be used to program a computer (or other electronic devices) to perform a process according to one embodiment of the present invention.

FIG. 1 is a block diagram illustrating an area light source (LS) 100 that subtends a solid angle omega (Ω) whose radiance output at a particular wavelength is characterized by the function L(p,ω). The function L(p,ω) is a function of a point in space p 112 of an object 110 and a direction ω 120. For a particular surface point p 112, with normal n 130 and a ray to the virtual camera e (the "eye" ray) 140, the reflected radiance from p 112 along e 140 due to the light source 100 can be expressed by the following reflected radiance integral:

$$I(p,n,e) = \int_{\omega \in \Omega} L(p,\omega) f_r(\omega,n,e) V p(\omega) d\omega \quad (1)$$

By convention, the differential measure dω is sometimes taken as subtended solid angle multiplied by the cosine of the angle between the normal n and the variable of integration ω, computed as n–ω. In the description below, however, dω is simply subtended solid angle, and the cosine term n–ω will be included in the BRDF function, $f_r$.

Within Equation (1) $f_r$ is a Bi-directional reflectance distribution function (BRDF) 200 that describes how light is scattered from direction ω 220 to e 240 with surface normal n 230. For example, as depicted in FIG. 2, a surface 202 with surface normal n 230 includes a camera 250 with an "eye" ray (e) 240 in one location, as well as plurality of incoming incident light rays according to various directions ω 222. As such, the Bi-directional reflectance distribution function 200 provides a value of the energy (radiance) reflected toward the camera 250 (i.e., based on the angle of the incident light ω). The $V_p$ term of Equation (1) is a visibility function with a value of 0 if p 112 is occluded from the light source 100 in the direction ω and 1 otherwise (see FIG. 1).

As depicted in FIG. 3, in image-based lighting (IBL), a sphere of incident illumination 300 is used as a light source to illuminate a synthetic object. (Typically, this sphere of incident illumination 300, called an environment map, is captured with a panoramic camera using high-dynamic range photography techniques.) Some rendering algorithm is then used to render the appearance of the synthetic object illuminated by the panoramic light source. The algorithm computes, at a surface point 310, the radiance (light energy) reflected towards some direction due to direct illumination (i.e., photons that have traveled directly from the light source to the surface, without having been reflected in between), as depicted in FIG. 1. The computation of this quantity involves calculating the value of an integral that is commonly referred to as the "reflected radiance integral" (Equation (1)).

In one embodiment, the integrand of Equation (1) is referred to as $H_{p,n,e}$ with Equation (1) rewritten as:

$$I(p,n,e) = \int_{\omega \in \Omega} H_{p,n,e}(\omega) d\omega. \quad (2)$$

As described herein, H is referred to as a "hemispherical transfer function", of units Watt/m²/sr², or radiance per solid angle.

In IBL, a light source is considered as positioned at the sphere at infinity. As a result, luminance provided the function L(p,ω) depends on the direction ω, such that the parameter p may be dropped from Equation (1). In one embodiment, the light source given by the function L(ω) is derived from measured data captured with a panoramic camera or radiance sensor. Once captured, the values of L(ω) are stored in an environment map. As described herein, the function L is described in an image-based lighting sense. Furthermore, the integral of Equation (1) is evaluated over the entire hemisphere 170 centered about surface normal n 130 (denoted by $\Omega_n$ or simply Ω), as depicted in FIG. 1.

The overriding cost of evaluating Equation (1) is testing the visibility term $V_p$, which typically requires casting a ray into the scene for each angle ω or ray sample. As known to those skilled in the art, ray tracing (also known an as "ray casting") is performed to determine the visibility of surfaces by tracing imaginary rays of light from the viewer's eye to the object seen, for example, as depicted in FIG. 1. Accordingly, ray casting is performed for each ray sample by casting a ray in each direction ω from point p.

In one embodiment, the number of times required to test the visibility term is minimized by reducing the number of hemispherical samples required to estimate Equation (1) with low noise and high accuracy. While it may be possible to use finite quadrature rules to estimate integrals, in one embodiment, Monte Carlo (MC). Quasi-Monte Carlo (QMC), or Randomized Quasi-Monte Carlo (R-QMC) methods are utilized to provide accuracy and flexibility. In one embodiment, the importance sampling technique described in further detail below provides effective results for as few as, for example, 128 hemispherical samples, even in a highly dynamic lighting environment.

Figure 4:
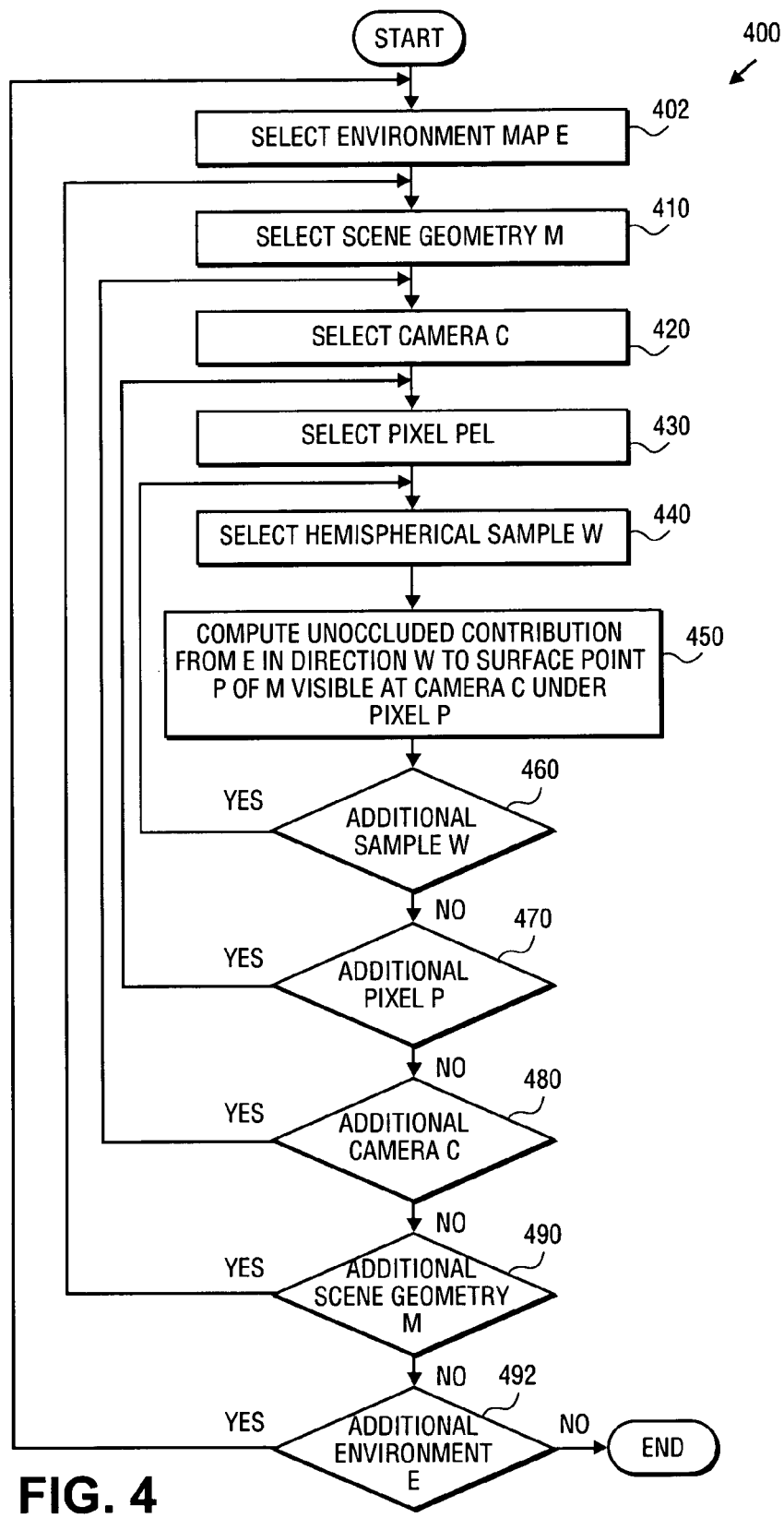
FIG. 4 is a flow chart illustrating a method for image rendering utilizing a reduced number of hemispherical samples to estimate the reflected radiance integral, in accordance with one embodiment of the invention.

FIG. 4 is a flow chart illustrating a method 400 for image rendering utilizing a reduced number of hemispherical samples to estimate the reflected radiance integral in accordance with one embodiment of the invention. As described in further detail below, the method 400 may be optimized by factoring as much as possible out of the inner loops. In one embodiment, this is performed by decreasing the required number of hemispherical samples, while providing efficient image quality. As a result, process blocks 440 and 450 (shading/color calculation) are performed fewer times, as compared to conventional techniques, without sacrificing rendered image quality. In one embodiment, given an environment map (L(ω)), precomputation as described below is performed, which may take approximately twenty minutes depending upon quality settings.

Importance sampling is an unbiased Monte Carlo technique that succeeds by placing more samples where the integrand has more energy. As known to those skilled in the art, the Monte Carlo technique provides a means for evaluating an integral for which a closed form solution does not exist by sampling the integral at random points. For example, given a function f over domain D, to estimate the integral $$I = \int_{x \in D} f(x) d\mu(x) \quad (3)$$

using importance sampling, a function p(x) is required such that samples can be drawn from domain D according to a probability density function (PDF) that is easy to calculate at any point in the domain D. For example, given N samples drawn from the domain D according to PDF p(x), the importance sample estimator of Equation (3) is $$\hat{I}_{p,N} = \frac{1}{N} \sum_{i=1}^{N} \frac{f(X_i)}{p(X_i)}.$$

Defining the residual r(x)=f(x)–Ip(x), $\hat{I}_{p,N}$ is a random variable, and its variance is given by the equation $$Var[\hat{I}_{p,N}] = \frac{1}{N} \int_{x \in D} \frac{r(x)^2}{p(x)}. \quad (4)$$

From this Equation, it is apparent that when the importance function p(x) is exactly proportion to the integrand f(x), the variance of this estimator is zero. In general, the more closely p(x) is proportional to f(x), the lower the variance of this estimator, allowing this estimator to quickly converge to an acceptable result.

Although importance sampling is used to estimate the reflected radiance integral, the various techniques are limited to estimation of the BRDF or $f_r$ and ignore the incident radiance function L(ω) (light source form) and visibility $V_p$ term of Equation (1). Although conventional techniques works well for uniform area light sources, these techniques are ineffective in IBL situations. In contrast to conventional techniques, the new importance sampling estimation of the reflected radiance integral matches all the features in the hemispherical transfer function $H_{p,n,e}$. ("H" function or H) (See Equations (1) and (2).)

Prior techniques are unable to provide the importance sampling estimation according to embodiments of the invention, since it is often difficult to select an importance function from which samples are easily drawn. In addition, the H function ($H_{p,n,e}$) is different for each point p because the visibility function $V_p$ changes with p. Accordingly, one embodiment of the invention, uses a piecewise-constant approximation to the H function that can be rapidly computed and sampled. In a further embodiment, a shadow cache is used to estimate the value of the visibility term $V_p$, based on nearby surface samples, which can then be combined with the piecewise-constant importance function to yield an efficient importance sampling scheme.

In one embodiment, H is split into a sum of several functions, each with small support. Let $$\{Ti\}\frac{M}{i=1}$$

be a partition of the unit hemisphere $\Omega_n$, such that $$T_i \cap T_j \neq 0 \Rightarrow i = j \text{ and } \bigcup \frac{M}{i=1} T_i = \Omega_n,$$

for example:

$$H(\omega) = \sum_{i=1}^{M} \chi_{T_i}(\omega) H(\omega)$$

where $\chi_{Ti}(\omega)$ is the indicator function over region $T_i$ that is 1 when $\omega \epsilon T_i$ and 0 otherwise. In the Lambertian case (diffuse reflection), the equation expands to $$H(\omega) = \sum_{i=1}^{M} \chi_{T_i}(\omega) L(\omega)(\omega \cdot n) V_p(\omega)$$

If a region $T_i$ is small enough, the value of H is approximated over $T_i$ as a constant function whose value is the average of H over $T_i$. Thus we have $$H(\omega) \approx \sum_{i=1}^{M} \chi_{T_i}(\omega) \frac{\int_{\theta \epsilon T_i} L(\theta)(\theta \cdot n) V_p(\theta) d\theta}{\text{Area}(T_i)} \quad (5)$$

where Area ($T_i$) is the surface area of the region $T_i$ and $\theta$ is a dummy variable of integration. Ignoring the visibility term $V_p$, the integral in the numerator can be interpreted as the response of the environment map defined by $L(\theta)\chi_{Ti}(\theta)$ under the Lambertian BRDF with normal n. In one embodiment an ambient occlusion approximation is used to approximate the visibility term's contribution with the average occlusion over the region $T_i$. In other words, let $$A_i(p) = \frac{\int_{\theta \epsilon T_i} V_p(\theta) d\theta}{\text{Area}(T_i)} \quad (6)$$

which gives a value $A_i(p)\epsilon[0,1]$. In one embodiment the term $A_i(p)$ is an approximated with the estimate $\hat{A}_i(p)$. Improving the accuracy of the estimate $\hat{A}_i(p)$ decreases the variance of an importance estimator of Equation (1), but to make the estimator unbiased requires $\hat{A}_i(p) > 0$ when $\hat{A}_i(p) > 0$. A piecewise-constant approximation to H, denoted $\hat{H}$ is, for example, $$\hat{H}_{p,n}(\omega) = \sum_{i=1}^{M} \chi_{T_i}(\omega) \frac{\hat{A}_i(p) \int_{\theta \epsilon \Omega} \chi_{T_i}(\theta) L(\theta)(\theta \cdot n) d\theta}{\text{Area}(T_i)} \quad (7)$$

where $\hat{H}$ is constant over each region $T_i$. Like H, $\hat{H}$ varies with the point p and the normal n.

In the above description, the BRDF is assumed to be Lambertian. In general, many standard BRDF functions can be parameterized by a single vector, called the free parameter of the BRDF. A Phong BRDF, for example, can be parameterized by only the reflection vector r. If the BRDF $f_r$ can be expressed this way, $\hat{H}$ will vary with point p and the free parameter vector. Then the above derivation may be repeated with the expression for the BRDF as a function of free parameter, e.g., the Phong BRDF $f_r(r,\theta)$ replacing the Lambertian BRDF $f_r(n,\theta)=(\theta n)$, yielding an alternate form of Equation (7):

$$\hat{H}_{p,r}(\omega) = \sum_{i=1}^{M} \chi_{T_i}(\omega) \frac{\hat{A}_i(p) \int_{\theta \epsilon \Omega} \chi_{T_i}(\theta) L(\theta) f_r(r, \theta) d\theta}{\text{Area}(T_i)}$$

Figure 5B:
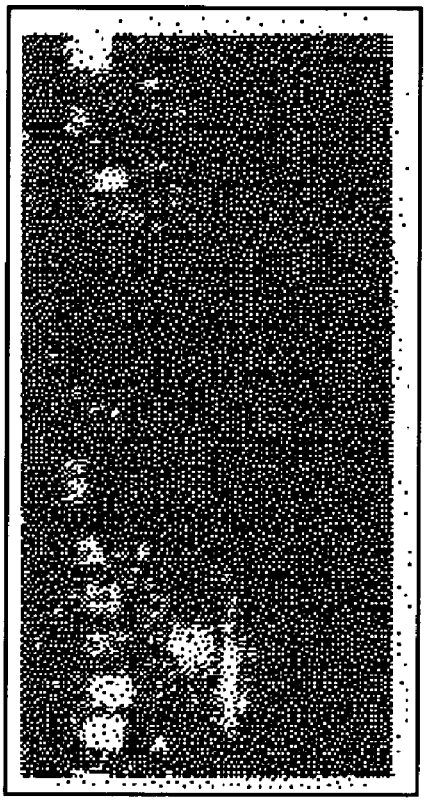
FIG. 5B is a photograph illustrating ray samples, in accordance with an embodiment of the invention for a reflected radiance calculation of the "grace" environment, as depicted in FIG. 5A.
Figure 5A:
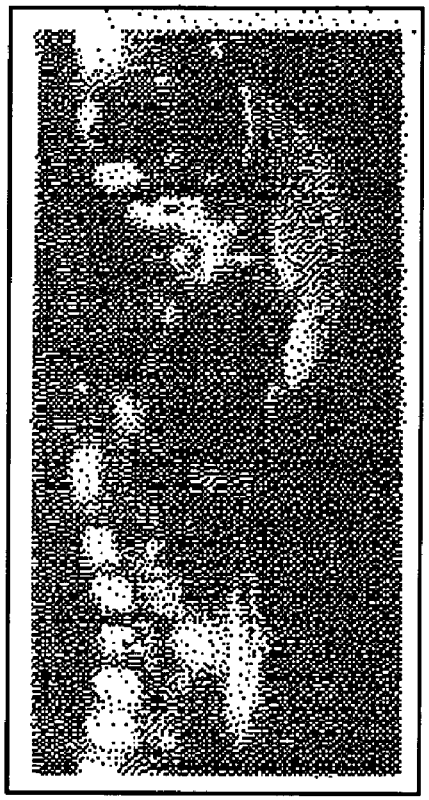
FIG. 5A is a picture illustrating a "grace" environment, a known benchmark for testing computer graphics applications.

FIG. 5A illustrates a two-dimensional representation of an environmental map 500 generated in response to the grace cathedral (grace environment), a known benchmark for testing computer graphics applications. In response to the grace environment with a Lambertian BRDF, the new importance sampling function (Equation (5)), generates ray samples in the areas of greatest illumination of the grace environment, as depicted in FIG. 5B. Although 1,000 ray samples are illustrated, in the embodiments described below, a reduced number of ray samples can be used as ω to computer the color value for a surface point. Accordingly, computation of the unoccluded contribution of surface point P at pixel PEL (shading/coloring) of process block 450 is performed for each ray sample ω.

Accordingly, by focusing the ray samples into areas that have the highest concentration of illumination, the new importance sampling function converges much faster than conventional BRDF-based importance sampling because the importance function matches the integrand more closely. In other words, utilizing importance sampling, in accordance with embodiments of the invention, the ray samples are concentrated over the brightest light sources even though they subtend a small solid angle, as depicted in FIG. 5B.

In one embodiment, for the Lambertian case, Equation (3) is used with $\hat{H}_{p,n}$ as the importance function, $\Omega n$ as the domain, and $H_{p,n}$ as the integrand. In one embodiment, $\hat{H}_{p,n}$ is efficiently evaluated at each pixel to enable drawing of samples from $\omega_n$ according to the distribution $\hat{H}_{p,n}$ along the unit hemisphere.

Figure 6A:
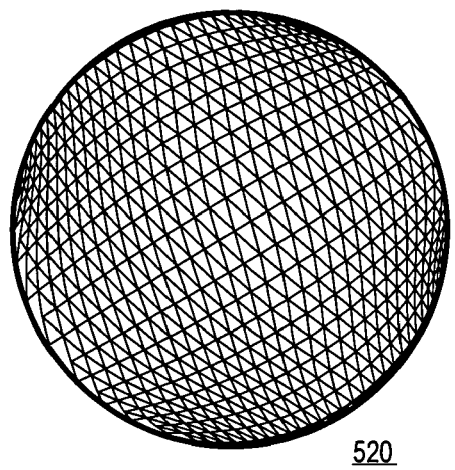
FIGS. 6A–6C are block diagrams illustrating tessellation of a spherical environment map, in accordance with one embodiment of the invention.

The approximation $\hat{H}_{p,n}$ depends on a particular partition of the hemisphere centered around n. Because n may change with every pixel, in one embodiment we generate a suitable partition on-the-fly, and compute $\hat{H}_{p,n}$ over each of the regions in this partition. For example, environment map 500 represents a two-dimensional map of a 360° image of the grace environment. A three-dimensional environment map of the grace environment is illustrated in FIG. 6A. As illustrated, environment map sphere 520 is partitioned into M spherical triangles.

For example, let $$\{Ti\}_{i=1}^{M}$$

be a fixed tessellation of the sphere 520 into, for example, M spherical triangles. In an alternative embodiment, a two-dimension environment map is tessellated into M-regions. One embodiment for generating a tessellation given the environment map 520 is described in further detail below. As a precomputation step, performed once per environment map for each spherical triangle $T_i$, in one embodiment, in the case when he surface is Lambertian, a diffuse convolution of $\omega_n L$, is computed as:

$$I_i(n) = \int_{\omega \in T_i} (\chi_{T_i}(\omega) L(\omega)(\omega \cdot n) d\omega) \quad (8)$$

In one embodiment, the results are stored in a texture map indexed by surface normal n. A polar coordinate parameterization of the $I_i$ map at, for example, a 32×64 resolution may be provided. (Generally, higher resolutions do make any difference in rendering quality.) The running time for pre-computation of the texture map is a proportional to M. For a different BRDF function, the convolution is computed and stored in a map parameterized by the BRDF free parameter.

In the inner loop of a rendering algorithm (process block 450 FIG. 4), an estimate of the reflected radiance at point p with normal n is required. In one embodiment, a tessellation of $\Omega_n$ is generated and the values of $\hat{H}_{p,n}$ are computed over each spherical triangle in this tessellation as follows. First, a weight $W_i$ is computed for each triangle $T_i$ in the fixed tessellation, $W_i = I_i(n) \hat{A}_i(p)$. $I_i(n)$ is precomputed and stored in a map. One embodiment for computing $\hat{A}_i(p)$ is discussed in further detail below.

Figure 6B:
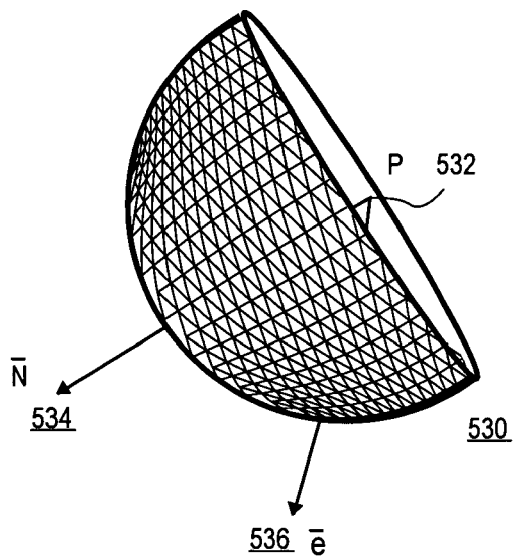

In one embodiment the tessellation of the hemisphere 530 about n 534 is adjusted by a "clipping" procedure, where each triangle is clipped against $\Omega_n$ to generate a visible triangle list as depicted in FIG. 6B. In other words, the tessellation sphere 520 is split into a hemisphere 530 of point P 532 with surface normal (n) 534, such that triangles below the horizon of the hemisphere 540 are disregarded and triangles that lie in both hemispheres are split. The algorithm for spherical triangle clipping is given in Appendix A. The result of clipping a triangle against the hemisphere is that either the entire triangle is outside the hemisphere 530, in which case it is not included in the visible list, the entire triangle is inside the hemisphere, in which case it is included in the visible list unmodified, or the triangle is partially inside the hemisphere, in which case the triangle is split.

As described in Appendix A, the portion of a partially clipped triangle $T_i$ that overlaps $\Omega_n$ can be expressed as either a smaller triangle $T_i^1$, or the union of two smaller non-overlapping triangles $T_i^1$ and $T_i^2$. In the case that a single triangle is produced, $T_i^1$ (but not $T_i$) is included in the visible list with weight to $W_i$. In the case that two triangles are produced, the weight is split proportional to the areas of the two result triangles, $$W_i^1 = \left(\frac{\text{Area}(T_i^1)}{\text{Area}(T_i)}\right) W_i, \ W_i^2 = W_i - W_i^1$$

and $T_i^1$ and $T_i^2$ are included in the visible list (but not $T_i$). The list of visible triangles is a partition of $\Omega_n$, and the value of $\hat{H}$ over a visible triangle $T_i$ is equal to the triangle's weight $W_i$ divided by its area, Area $(T_i)$.

Figure 6C:
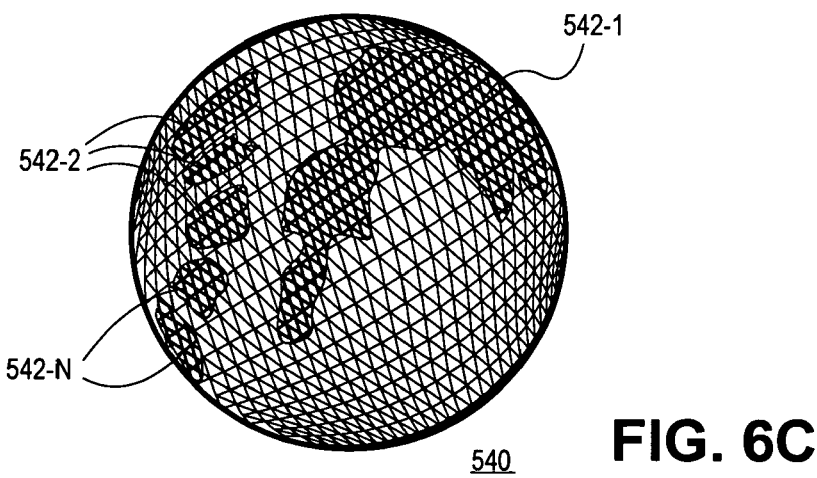

As stated in Equation (4), the variance of an estimator is the integral of the ratio of the squared residual to the importance function. Thus a high variance exists when the residual is high relative to the estimated importance. In general, the variance of an estimator is high when $L(\omega) f_r(\omega, n, \omega') V_p(\omega)$ varies over the area of the triangle. Because $f_r(\omega, n, \omega')$ and $V_p(\omega)$ depend on n and p, there is no way to take them into account when devising the fixed tessellation of the sphere. In one embodiment, the residual error is reduced by minimizing the variation of $L(\omega)$ over each triangle by more finely tessellation regions 642 of the sphere 640 where variance of $L(\omega)$ is greatest for example as depicted in FIG. 6C.

In a further embodiment, a greedy algorithm is used to generate adaptive triangulations of the sphere 640. Initially an icosahedron, which has 20 triangles, is subdivided a minimum number of times (a minimum level of three works well). All triangles are placed in a heap sorted in decreasing order by the variance of the environment map $L(\omega)$ over the region of that triangle. Given a triangle budget M, the first triangle from the heap (which will have the largest variance) is iteratively removed. If the subdivision level is below a user threshold, the triangle is subdivided once, and the four new child triangles are placed back on the heap. The process halts when there are M total triangles.

Figure 6D:
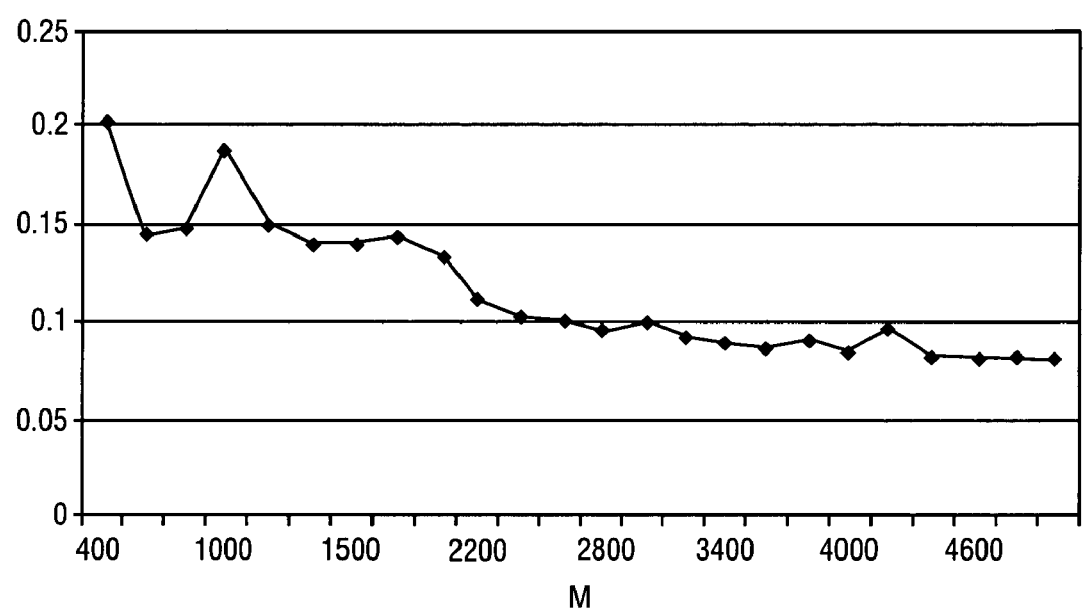
FIG. 6D is a graph illustrating results for estimation of the reflected variance integral.

M is a quality setting that may be set quite high without adversely affecting rendering times. In practice, a scene as depicted in FIG. 5A, is rendered at 10,000 samples per pixel as a baseline. The scene is then rendered with different values of M (x-axis) at, for example, 165 samples per pixel, and the $L^2$ distance (y-axis) is computed between the rendered image and the baseline image. The plot of this error is shown in FIG. 6D. The error decreases significantly up until about 2200, then levels off around M=3500, although it continues decreasing slightly.

Figure 7:
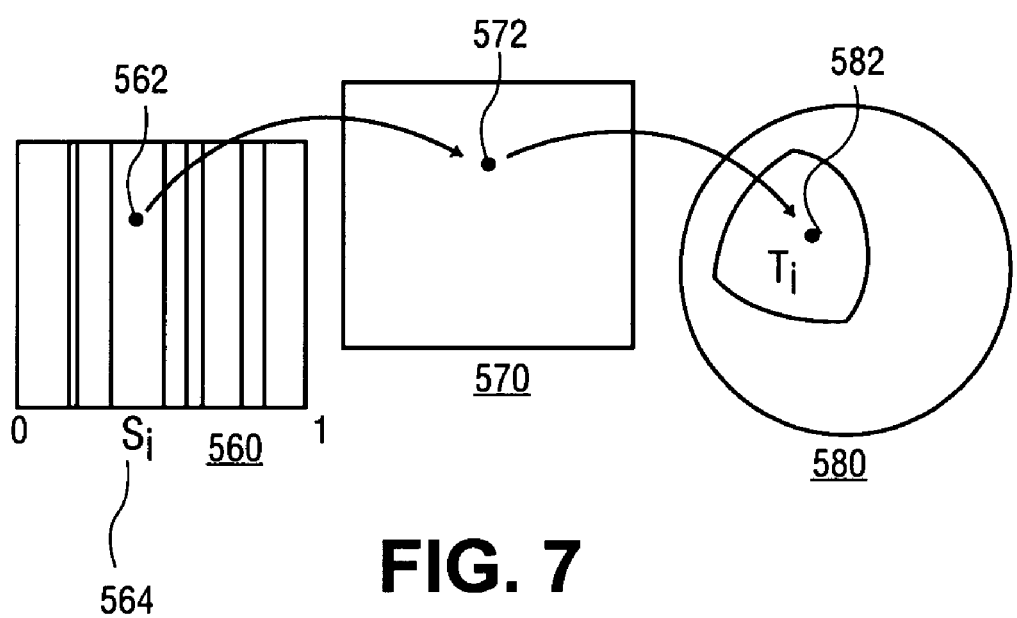
FIG. 7 is a block diagram illustrating mapping of a value from a unit square to a hemisphere, according to the weight of each spherical triangle, in accordance with one embodiment of the invention.

In one embodiment, ray samples of $\Omega$ are drawn according to $\hat{H}$ as illustrated with reference to FIG. 7. First, for each triangle in the visible list a normalized weight $\overline{W}_i$ is computed as $$\overline{W}_i = \frac{W_i}{\sum_{T_i \text{visible}} W_i}$$

which is the probability that a sample will be drawn from visible triangle $T_i$. A map m: $[0,1] \times [0,1] \to \Omega$ is built, such that if x is uniformly distributed over [0,1]×[0,1], then m(x) is distributed over Ω with probability Ĥ, as illustrated in FIG. 7. Let $M_{vis}$ be the number of visible triangles. The interval [0,1] is divided into $M_{vis}$ non-overlapping subintervals $S_i$=[$a_i$,$b_i$), such that the length of $S_i$ 564 is $W_i$. In one embodiment a function Idx(x) maps from a randomly selected point 562 in x∈[0,1] to index i such that X∈$S_i$. Idx can be efficiently implemented using, for example, a binary search. In addition a map function (Coord (i,x)) is defined as $$Coord(i, x) = \frac{x - a_i}{b_i - a_i}$$

Finally, m is defined as m(u,v)=SphTri($T_{Idx(u)}$,Coord(Idx (u),u),v) where the SphTri function is an area-preserving map from the unit square to a spherical triangle $T_{Idx(u)}$. FIG. 7 is a schematic view of m, where Idx(u)=i,m(u,v)∈$T_i$, and the value of Ĥ(m(u,v)) is $W_i$/Area($T_i$). In one embodiment, as illustrated with reference to FIG. 7, the subintervals of length $S_i$ 564 within a first unit square 560 are normalized relative to the unit square 570. Accordingly, the function m(u,v) maps from the unit square 570 to the hemisphere 586 according to the weight of each spherical triangle.

In one embodiment, first, the index of a point 562 is determined based on which span $S_i$ its x coordinate lies in. The point is then mapped to the unit's square by normalizing its position within $S_i$ relative to unit square 570, via the coordinate function. Once normalized, the point is then mapped to the spherical triangle $T_i$ of sphere 630, as point 632 via the SphTri function. As such, in accordance with FIG. 7, an approximation of Ĥ enables the ray samples to be uniformly distributed over the brightest light sources, for example, as depicted with reference to FIG. 5B.

In one embodiment, if $\{x_j\}_{j=1}^N$ are random samples uniformly distributed over [0,1]×[0,1], an environment-based importance sampling estimator for the reflected radiance integral of Equation (1) with a Lambertian BRDF is, for example, $$\hat{I}_{\hat{H},N}(p, n) = \frac{1}{N}\sum_{j=1}^{1} \frac{L(m(x_j))(m(x_j) \cdot n)V_p(m(x_j))}{\hat{H}(m(x_j))} \quad (9)$$

The per-hemispherical sample cost of this estimator is O(log(M)), which the cost of the Idx function, so the overall cost of this estimator is O(N·(log(M)+A)), where A is the cost of evaluating $V_p$. The per-pixel cost to generate the visible triangle list and compute the triangle weights is O(M).

Figure 8:
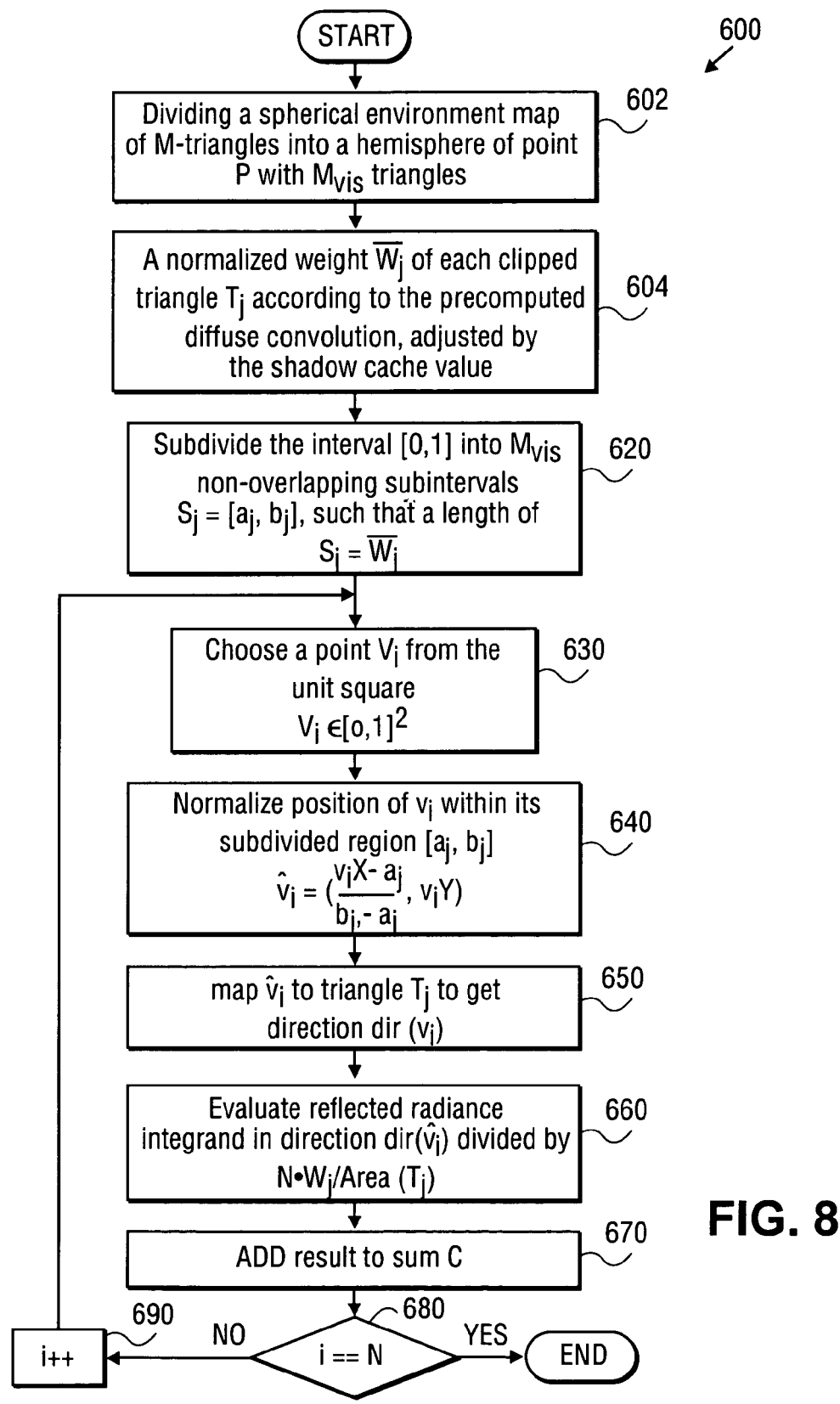
FIG. 8 is a flow chart illustrating a method for shading a point utilizing a reduced number of hemispherical samples to estimate the reflected radiance integral, in accordance with one embodiment of the invention.

While m has the desired sampling property, it is discontinuous and hence will destroy any stratification structure of the point set $\{x_j\}$. Despite this, points $\{x_j\}$ generated using randomized QMC (R-QMC) sequences gives better results than independently drawn samples. One embodiment for coloring a point P with surface normal N using a Lambertian BRDF is depicted with reference to FIG. 8.

In an alternative embodiment, a pixel-based decomposition could be used rather than the triangular decomposition of the hemisphere. In this embodiment precomputation is not required, but the technique is not as accurate. However, this embodiment is much simpler to implement.

Figure 9:
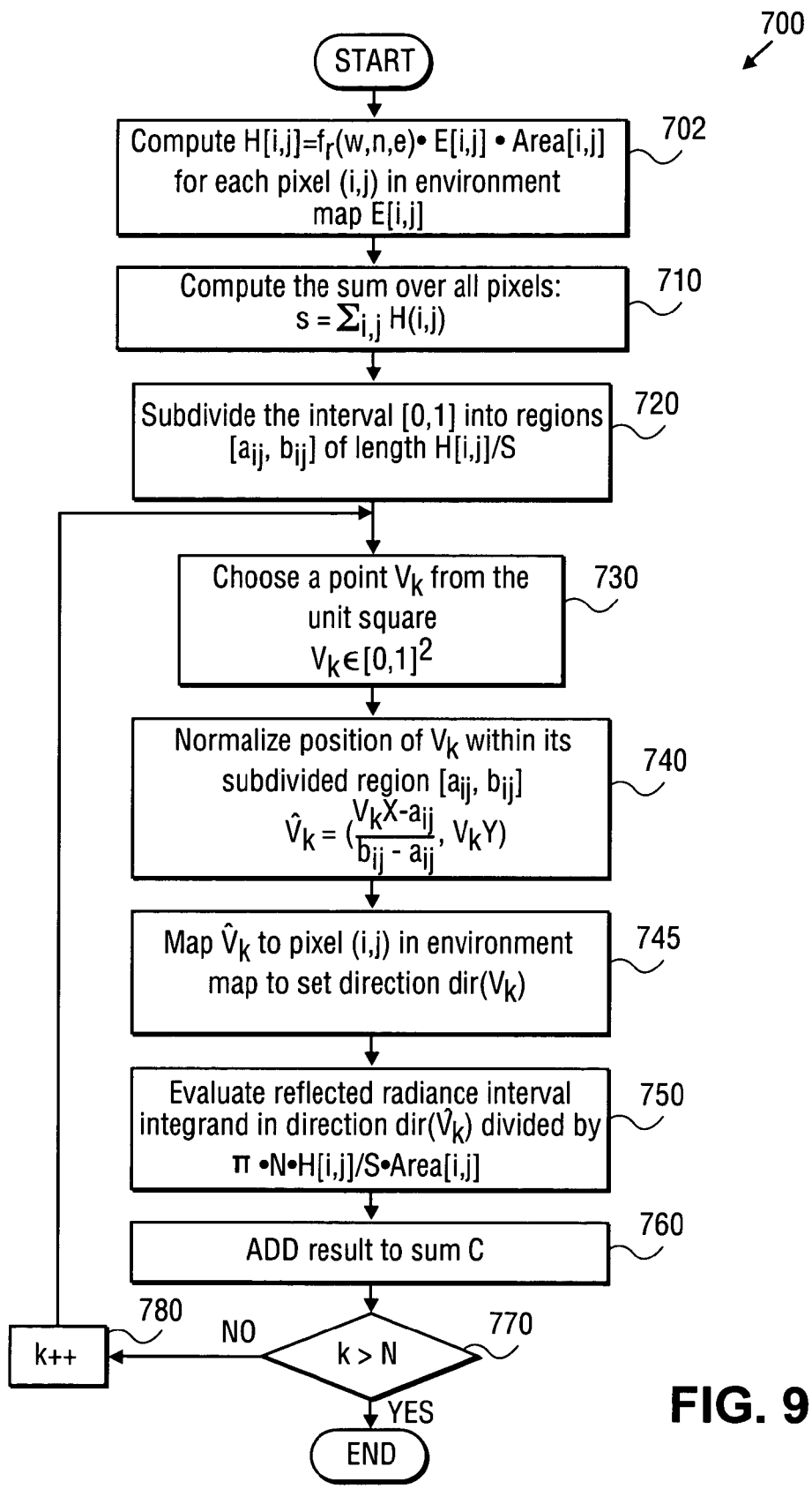
FIG. 9 is a flow chart illustrating a method for shading a point utilizing a reduced number of hemispherical samples to estimate the reflected radiance integral, in accordance with a further embodiment of the invention.

In one embodiment E[.,.] is a low-resolution version of the environment map, for example, as shown in FIG. 5A, with width w and height h (standard polar parameterization) with the positive Y-direction corresponding to the top row in E. For example, assume shading of a surface point p with normal n is performed. Given a pixel (i,j) corresponding to direction ω in the environment map, the probability of drawing a sample from that pixel is proportional to Prob{(i,j)}=max(ω*n,0)E[i,j]Area(i,j)

where Area(i,j) is the area subtended by the pixel, which is estimated as $4\pi^2$ sqrt(1−$ω_y$)/wh. In this embodiment, the formula is specific for a Lambertian BRDF. However, in alternative embodiments, the max(ω*n,0) could be replaced with any BRDF function of n,ω, and e (where e is the direction in which reflected radiance is being calculated):

As depicted with reference to FIG. 9

$$H[i,j]=f_r(ω,n,e)·E[i,j]·\text{Area}(i,j) \quad (10)$$

is computed for each pixel in E. Once computed, a sum over all pixels, S=$\Sigma_{i,j}$H(i,j) is calculated. The probability of choosing pixel (i,j) is equal to H(i,j)/S, and the value of the importance function over pixel (i,j) is H(i,j)/(Area(i,j)S). Samples can be distributed over the hemisphere according to this importance function by using a map similar to m(u,v) function described above. From these building blocks, a standard importance sampling estimator is used with importance function H to estimate the reflected radiance, as depicted in process blocks 720–780 in FIG. 9. In this embodiment, H is a piecewise-constant importance function over the sphere.

In a further embodiment, if there are other light sources in the environment with different importance functions for sampling, the light source can be combined in accordance with the embodiments described above using a balance heuristic. The balance heuristic is a technique for combining multiple importance sampling estimators into a single estimator. Furthermore, the visibility term ($V_p$) makes Equation (1) very difficult to solve because it makes the integrand discontinuous. However, there is coherence in the values of $V_p$ within a neighborhood of p. In one embodiment, a method of estimating $A_i$(p) of Equations (6) and (7) takes advantage of this coherence.

Furthermore, the visibility term ($V_p$) makes Equation (1) very difficult to solve because it makes the integrand discontinuous. However, there is coherence in the values of $V_p$ within a neighborhood of p. In one embodiment, a method of estimating $A_i$(p) of Equations (6) and (7) takes advantage of this coherence. In one embodiment, whenever a hemispherical ray is cast (ray tracing) to determine occlusion, we note from which triangle $T_i$ in the fixed spherical tessellation the sample was taken, and record whether the ray was occluded or not. For each triangle $T_i$, we compute a denominator $d_i$ equal to the total number of rays cast through that triangle, and a numerator $n_i$ equal to the number of those rays that were unoccluded. In one embodiment, the values $d_i$ and $n_i$ are stored in a data structure such as a table, or a cache, referred to herein as a shadow cache. In one embodiment, the shadow cache values can be stored at a different angular resolution than the fixed tessellation used in Ĥ, as long as there is a correspondence between the indices.

As described herein, a complete set of values $n_i$ and $d_i$ centered about a particular point are referred to as a cache item. In one embodiment, cache items are stored in a data structure, the shadow cache, or any other desired location. To compute $\hat{A}_i$(p), the shadow cache is searched for all cache items proximate to a point p and the sums of the items' numerators and denominators, σ$n_i$ and σ$d_i$ are computed. If σd_l is less than some threshold (we use 3), there is not enough information to make a good estimate, such that a value of 1 is used as the estimate $\hat{A}_i(p)$. Otherwise, $\sigma n_l/\sigma d_l$ is used as $\hat{A}_i(p)$.

In one embodiment, the visibility value $\hat{A}_i$ following defensive importance sampling, is remapped according to a turnable parameter $\alpha \epsilon [0,1]$, for example, $$\alpha \hat{A}_i(p)+(1-\alpha)(0.5)$$

which prevents $\hat{H}$ from having an arbitrarily small tail distribution. In practice improved results were achieved with a value $\alpha=0.7$.

In one embodiment, contents of the shadow cache are pre-computed. In accordance with this embodiment, initially, several rays are cast into the scene from each surface point in order to build a data structure, such as a table (the shadow cache) that counts how many rays in a given direction are occluded or unoccluded. In one embodiment, a sampling algorithm uses this information to build the approximation of the hemispheric transfer function H. In an alternative embodiment, as depicted with reference to FIGS. 10A-10B, the initial casting of rays may be used to form a low-resolution block image 830, for example, as depicted with reference to FIG. 10C.

In other words, as depicted with reference to FIG. 10A, several rays are cast from a point P 802 to determine occlusion. Initial casting of the rays results in a spherical image, depicted in FIG. 8B with a polar parameterization which illustrates occluded areas 822 and unoccluded areas 824 by ball 804. Based on this information, a low-resolution image 830 is formed. In one embodiment, occluded pixels are colored black, while unoccluded pixels are colored white. Likewise, partially occluded pixels may be colored gray. In accordance with this embodiment, the low resolution block image 830 may be stored as the shadow cache information.

Accordingly, using the image of occlusion 830, for a given pixel, and one or more nearby (proximate) pixels, in one embodiment, a linear blend may be performed to determine the visibility of the pixel. Accordingly, using a low-resolution image of occlusion 830, an approximation of the reflected radiance integral provides an estimate that is based on each of the elements of the reflected radiance integral (e.g., light source contribution, BRDF, and visibility). Moreover, by utilizing the low-resolution occlusion image, the amount of ray casting which is required to determine reflected radiance is drastically reduced by leading to faster convergence of the importance sampling estimator.

Figure 11:
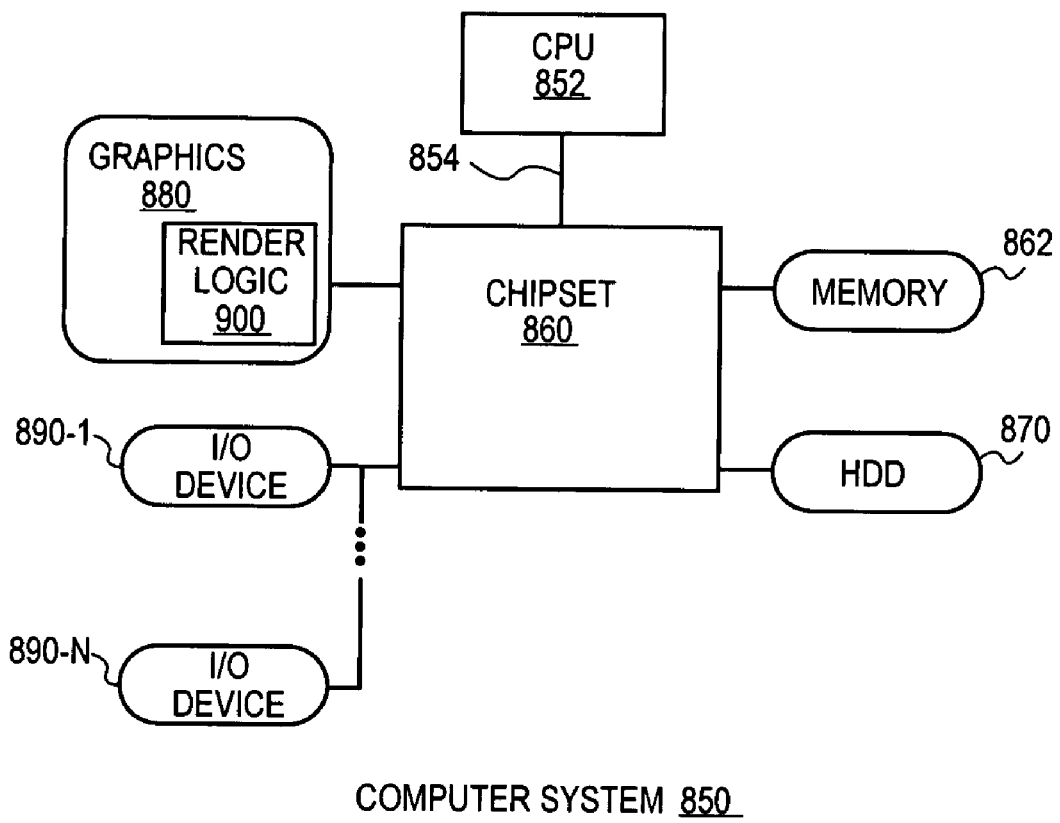
FIG. 11 is a block diagram illustrating a computer system including render logic for estimating a reflected radiance integral under complex distant illumination in accordance with one embodiment of the invention.

FIG. 11 is a block diagram illustrating computer system 850, which includes render logic 900 for estimating reflected radiance under complex distant illumination, in accordance with one embodiment of the invention. Computer system 850 comprises a processor system bus (front side bus (FSB)) 854 for communicating information between a processor (CPU) 854 and a chipset 860 coupled together via FSB 854. As described herein, the term "chipset" is used in a manner well known to those skilled in the art to describe collectively the various devices coupled to the CPU to perform desired system functionality.

Chipset 860 is also coupled to main memory 862 and one or more input/output (I/O) devices 890 (890-1, . . . , 890-N). In addition, hard disk drive devices (HDD) 870, as well as one or more I/O devices 890 (890-1, . . . , 890-N) are also coupled to chipset 860. In the embodiment illustrated, graphics device 880 is also coupled to chipset 860. In the embodiment illustrated, graphics device 880, such as a graphics card, includes render logic 900, which includes shade logic for generating a color value using an important sampling estimator for a reflected radiance integral. The importance sampling estimator selects a plurality of ray samples to generate the color value according to at least a light source term and a BRDF term of the reflected radiance integral, as described above.

Figure 12:
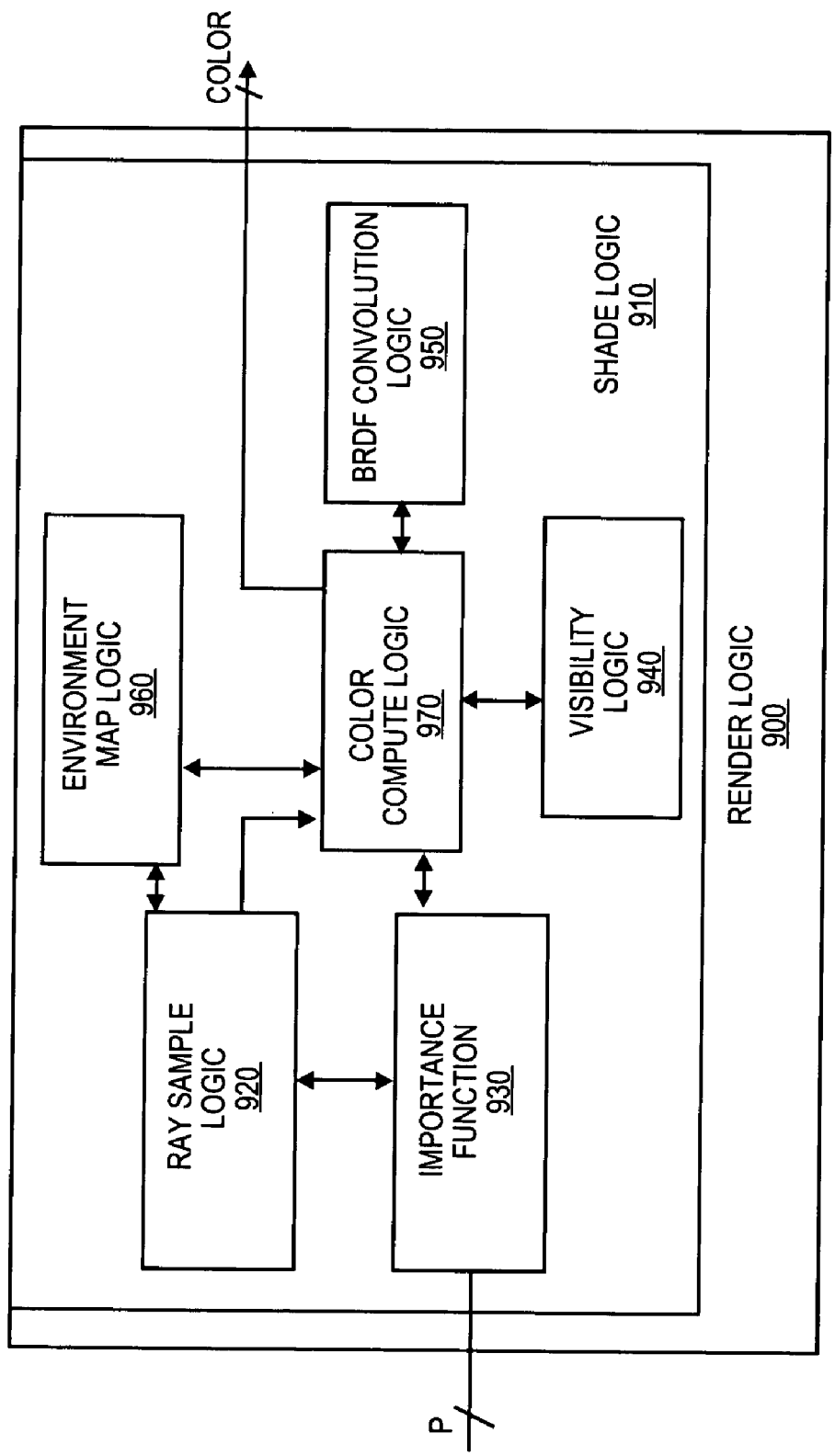
FIG. 12 is a block diagram further illustrating render logic, as depicted in FIG. 11, in accordance with a further embodiment of the invention.

As illustrated in FIG. 12, render logic 900, provides shade logic 910 with a point P with surface normal N. In response, shade logic returns an intensity or color value for the point P. Shade logic 910 includes importance function logic 930, as well as ray sample logic 920, which are responsible for providing a reduced number of ray samples without compromising the quality of a final rendered image. In addition, in one embodiment, ray sample logic 920 performs sphere tessellation, as described with references to FIGS. 6A–6C in order to identify and provide ray samples where light energy is most prevalent.

Shade logic 910 may also include environment map logic 960 to store, for example, an environment map, such as described with reference to FIG. 5A. In addition, visibility logic 940 is provided to store, for example, a low resolution block image to determine visibility, as described with reference to FIGS. 10A–10C. In a further embodiment, BRDF convolution logic 950 is responsible for performing precomputation according to, for example, Equation (8), as described above. As such, using the various logic blocks, shade logic 910 utilizes color compute logic 970 to generate a color value using the importance sampling estimator as described, for example, with reference to Equation (9), as described above.

Although reduced hemispherical sample estimation of the reflected radiance integral may incur overhead (evaluating at every pixel or triangle), the savings gained by the sampling deduction justifies the overhead. As a result of the reduced number of hemispherical samples, an accurate estimate of a reflected radiance value is generated with a reduced computation time. In one embodiment, a new importance sampling is used in order to estimate the reflected radiance integral. The new importance sampling algorithm converges faster than conventional BRDF-based importance sampling or lighting environment-based importance sampling because the importance function matches the integrand more closely. Also, the new importance function is efficient to evaluate and draw samples from, making it practical for use in a rendering package. Using this new technique, rendered images of an acceptable quality can be computed, for example, over 10 times faster than the previous best, exact techniques.

ALTERNATE EMBODIMENTS

Several aspects of one implementation of the new importance sampling for providing reflected radiance have been described. However, various implementations of the estimation provide numerous features including, complementing, supplementing, and/or replacing the features described above. Features can be implemented as part of offline rendering part of the shading calculation in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a estimating reflected radiance under complex distant illumination, it will be appreciated by those skilled in the art that the embodiments of the present invention can be applied to other systems. In fact, systems for IBL based image rendering fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

APPENDIX A

Given a spherical triangle ABC defined by vertices A, B, and C, and a hemisphere centered about n, $\Omega_n$, we want to compute whether the triangle overlaps the hemisphere, and if so, to describe the region of overlap. First, we test if the dot product of each vertex with n is positive or negative. Let t be the number of vertices with positive dot product.

If t=0, the triangle is fully outside the hemisphere.

If t=3, the triangle is fully inside the hemisphere.

If t=2, then the triangle partially overlaps and the intersection of ABC with $\Omega_n$ can be described as the union of two spherical triangles. Let A be the vertex that such that A·n<0. Let D be the point where the great arc that bounds $\Omega_n$ intersects the great arc segment AB,D=$\Omega_n \cap$AB. This is computed as D=±x(A'B), where the sign is chosen so that D lies between A and B. Similarly, let E=$\partial\Omega_n \cap$AC. Then the two resulting triangles are BCD and CED.

If t=1, then the triangle partially overlaps $\Omega_n$ is a single spherical triangle. Let A be the vertex such that A·n>0. Define D and E as above. The resulting triangle is ADE.

What is claimed is:

1. A method comprising:
    receiving a request to generate a color value of a point P with surface normal N; and
    computing the color value for the point P using an importance sampling estimator for a reflected radiance integral, where the importance sampling estimator selects a plurality of ray samples for evaluation of the reflected radiance integral at the point P to generate the color value, where ray sample directions are chosen according to information obtained from at least a light source term and a bi-directional reflectance distribution function (BRDF) term of the reflected radiance integral.

2. The method of claim 1, wherein computing the color value comprises:
    generating an importance function for an integrand of the reflected radiance integral; and
    selecting a plurality of ray samples on a unit hemisphere surrounding the point P with surface normal N according to the importance function.

3. The method of claim 1, wherein the importance sampling estimator selects the plurality of ray samples and ray sample directions according to information obtained from the based on a visibility term, the BRDF term and the light source term of the reflected radiance integral.

4. The method of claim 2, wherein the importance function approximates a product of the light source term and the BRDF term of the integrand of the reflected radiance integral.

5. The method of claim 2, wherein the importance function approximates a product of the light source term, the BRDF term, and the visibility term of the integrand of the reflected radiance integral.

6. The method of claim 2, wherein generating the importance function comprises:
    partitioning a unit hemisphere surrounding the point P into M non-overlapping regions;
    approximating a value of the integrand of the reflected radiance integral as a piece-wise constant function that is constant over each of the M non-overlapping regions; and
    using this piece-wise constant approximated value as the importance function.

7. The method of claim 2, wherein selecting ray samples comprises:
    partitioning a hemisphere about the surface normal N into M non-overlapping regions;
    computing a normalized weight of each non-overlapping region; and
    mapping points from a unit square into a unit hemisphere according to the normalized weight of the non-overlapping regions.

8. The method of claim 7, wherein mapping further comprises:
    dividing an interval into a plurality of sub-intervals according to the non-overlapping regions such that a length of each respective sub-interval is equal to a normalized weight of the non-overlapping region used to form the sub-interval;
    selecting a random point X,Y from a unit square;
    determining a sub-interval containing the X-component of the selected point;
    mapping the point to the unit square according to a length of the sub-interval; and
    mapping the point from the unit square to a non-overlapping region corresponding to the determined sub-interval.

9. The method of claim 8, wherein mapping to the unit square comprises:
    normalizing a position of the point within the determined sub-interval; and
    mapping the normalized position of the point within the unit square.

10. The method of claim 2, wherein selecting ray samples comprises:
    tessellating an environment map sphere into M non-overlapping spherical triangles;
    forming a hemisphere from the tessellated sphere about the surface normal N for the point P;

generating a visible triangle list of the non-overlapping spherical triangles on the hemisphere;

computing a normalized weight of each visible spherical triangle; and mapping points from a unit square onto triangles of the hemisphere according to a respective normalized weight of the triangles, such that the mapped points on the hemisphere are used as the selected ray samples.

11. The method of claim 10, wherein tessellating the environment map sphere further comprises:

determining one or more triangles within the tessellated sphere having a variance above a predetermined value;

tessellating the one or more identified triangles into non-overlapping triangles; and repeating the identifying and tessellating until a predetermined number of spherical triangles are formed.

12. The method of claim 8, wherein generating the visible triangle list further comprises:

determining, for each spherical triangle, whether the triangle is contained within the hemisphere;

placing each triangle within the hemisphere in the visible triangle list;

subdividing triangles determined as partially included in the hemisphere into one or more triangles contained in the hemisphere;

adjusting a weight of each of the subdivided triangles; and adding the subdivided triangles into the visible triangle list.

13. The method of claim 2, wherein prior to receiving the request, the method further comprises:

tessellating a spherical environment map into M non-overlapping spherical triangles;

calculating a convolution of each spherical triangle against a surface BRDF; and storing each calculated convolution in a map.

14. The method of claim 13, wherein calculating the convolution comprises:

selecting a spherical triangle;

selecting a direction to be used as a free parameter of the BRDF term;

selecting a direction that is subtended by the selected spherical triangle;

computing a product of a value of the BRDF term for the selected free parameter direction times a value of the environment map in the selected direction from the spherical triangle;

adding the product to a sum;

repeating selecting of the free parameter direction and computing of the product for each direction subtended by the selected spherical triangle; and repeating selecting the spherical triangle, selecting of the free parameter and computing of the diffuse convolution for each of the M spherical triangles.

15. The method of claim 1, wherein computing the color value comprises:

selecting a ray sample according to an importance function;

selecting an environment color from an environment map according to the ray sample;

determining a visibility value according to the selected ray sample;

calculating the BRDF term according to the selected ray sample, a surface normal and an eye ray to a virtual camera;

calculating an intermediate color value according to the environment color, visibility value and BRDF value, divided by a value of the importance function according to the ray sample;

adding the intermediate color value to a sum; and repeating selecting of the ray sample, selecting of the environment color, determining of the visibility term, determining of the BRDF term and calculating of the intermediate color value for each ray sample such that a final value of the sum represents a color value for the point P with surface normal N.

16. The method of claim 10, wherein computing a normalized weight of each visible spherical triangle comprises:

selecting a spherical triangle;

looking up a color value in a convolved map generated for the selected triangle at a pixel location determined by the surface normal N and the eye ray;

calculating a weight of the selected triangle as an intensity of the color value;

adding the weight of the selected triangle to a sum;

repeating the looking up of the color value, calculating the triangle weight and adding the triangle weight for each triangle; and dividing each triangle's weight by the sum of the weights of all of the triangles.

17. The method of claim 16, wherein calculating the weight of the selected triangle by the sum of the weight for each triangle further comprises:

estimating a value of the visibility term over the selected triangle; and scaling the weight selected by the estimated value.

18. The method of claim 17, wherein estimating the value of the visibility term comprises:

querying a visibility data structure for visibility values of one or more points proximate the point P;

computing a blend of the one or more visibility values; and computing a visibility value for the point P according to the blend of the proximate visibility points.

19. The method of claim 1, wherein prior to receiving the request, the method further comprises:

selecting a scene;

casting a predetermined number of rays for each surface point of the scene; and determining a count of a number of rays in a given direction indicated as occluded/unoccluded;

forming a low resolution image according to the count; and storing the low resolution image within a data structure.

20. The method of claim 15, wherein calculating the intermediate color value comprises:

computing a product of the BRDF term, the visibility term and the color term;

identifying a region associated with the ray sample;

computing an inverse probability value of the region associated with the ray sample; and computing the initial color value as the computed product divided by the inverse probability value.

21. The method of claim 2, wherein generating the importance function comprises:

computing, for each pixel within an environment map, a product of a BRDF term, evaluated in a direction corresponding to the pixel, times an environment map term evaluated in the direction corresponding to the pixel.

22. The method of claim 2, wherein selecting ray samples comprises:
subdividing a unit interval into several regions, where a length of each region is equal to a value of an integrand approximation for a pixel times an area subtended by the pixel, divided by a sum of the integrand approximation times an area subtended by each pixel over all pixels;
choosing a point from a unit square;
normalizing a position of the selected point within its subdivided region; and
selecting a ray sample according to a direction of the pixel.

23. The method of claim 2, wherein selecting ray samples, the method further comprises:
selecting a pixel with probability determined by a value of the integrand approximation multiplied by an area of the pixel;
choosing a random point within the pixel;
mapping the point within the pixel to a sphere such that the map point represents a ray sample; and
repeating the choosing of a pixel, choosing of a random point and mapping for each pixel of the environment map.

24. The method of claim 1, wherein the light source term of the reflected radiance integral comprises:
a contribution function that depends only on direction, such that the point P is lit by an environment map.

25. An article of manufacture including a machine readable medium having stored thereon instructions which may be used to program a system to perform a method, comprising:
receiving a request to generate a color value of a point P with surface normal N; and
computing the color value for the point P using an importance sampling estimator for a reflected radiance integral, where the importance sampling estimator selects a plurality of ray samples for evaluation of the reflected radiance integral at the point P to generate the color value, where ray sample directions are chosen according to information obtained from at least a light source term and a bi-directional reflectance distribution function (BRDF) term of the reflected radiance integral.

26. The article of manufacture of claim 25, wherein computing the color value comprises:
generating an importance function for an integrand of the reflected radiance integral; and
selecting a plurality of ray samples on a unit hemisphere surrounding the point P with surface normal N according to the importance function.

27. The article of manufacture of claim 25, wherein the importance sampling estimator selects the plurality of ray samples and ray sample directions according to information obtained from the based on a visibility term, the BRDF term and the light source term of the reflected radiance integral.

28. The article of manufacture of claim 26, wherein the importance function approximates a product of the light source term and the BRDF term of the integrand of the reflected radiance integral.

29. The article of manufacture of claim 26, wherein the importance function approximates a product of the light source term, the BRDF term, and the visibility term of the integrand of the reflected radiance integral.

30. The article of manufacture of claim 26, wherein generating the importance function comprises:
partitioning a unit hemisphere surrounding the point P into M non-overlapping regions;
approximating a value of the integrand of the reflected radiance integral as a piece-wise constant function that is constant over each of the M non-overlapping regions; and
using this piece-wise constant approximated value as the importance function.

31. The article of manufacture of claim 26, wherein selecting ray samples comprises:
partitioning a hemisphere about the surface normal N into M non-overlapping regions;
computing a normalized weight of each non-overlapping region; and
mapping points from a unit square into a unit hemisphere according to the normalized weight of the non-overlapping regions.

32. The article of manufacture of claim 31, wherein mapping further comprises:
dividing an interval into a plurality of sub-intervals according to the non-overlapping regions such that a length of each respective sub-interval is equal to a normalized weight of the non-overlapping region used to form the sub-interval;
selecting a random point X,Y from a unit square;
determining a sub-interval containing the X-component of the selected point;
mapping the point to the unit square according to a length of the sub-interval; and
mapping the point from the unit square to a non-overlapping region corresponding to the determined sub-interval.

33. The article of manufacture of claim 32, wherein mapping to the unit square comprises:
normalizing a position of the point within the determined sub-interval; and
mapping the normalized position of the point within the unit square.

34. The article of manufacture of claim 26, wherein selecting ray samples comprises:
tessellating an environment map sphere into M non-overlapping spherical triangles;
forming a hemisphere from the tessellated sphere about the surface normal N for the point P;
generating a visible triangle list of the non-overlapping spherical triangles on the hemisphere;
computing a normalized weight of each visible spherical triangle; and
mapping points from a unit square onto triangles of the hemisphere according to a respective normalized weight of the triangles, such that the mapped points on the hemisphere are used as the selected ray samples.

35. The article of manufacture of claim 34, wherein tessellating the environment map sphere further comprises:
determining one or more triangles within the tessellated sphere having a variance above a predetermined value;
tessellating the one or more identified triangles into non-overlapping triangles; and
repeating the identifying and tessellating until a predetermined number of spherical triangles are formed.

36. The article of manufacture of claim 34, wherein generating the visible triangle list further comprises:
determining, for each spherical triangle, whether the triangle is contained within the hemisphere;

placing each triangle within the hemisphere in the visible triangle list;

subdividing triangles determined as partially included in the hemisphere into one or more triangles contained in the hemisphere;

adjusting a weight of each of the subdivided triangles; and adding the subdivided triangles into the visible triangle list.

37. The article of manufacture of claim 26, wherein prior to receiving the request, the method further comprises:

tessellating a spherical environment map into M non-overlapping spherical triangles;

calculating a convolution of each spherical triangle against a surface BRDF; and storing each calculated convolution in a map.

38. The article of manufacture of claim 37, calculating the convolution comprises:

selecting a spherical triangle;

selecting a direction to be used as a free parameter of the BRDF term;

selecting a direction that is subtended by the selected spherical triangle;

computing a product of a value of the BRDF term for the selected free parameter direction times a value of the environment map in the selected direction from the spherical triangle;

adding the product to a sum;

repeating selecting of the free parameter direction and computing of the product for each direction subtended by the selected spherical triangle; and repeating selecting the spherical triangle, selecting of the free parameter and computing of the diffuse convolution for each of the M spherical triangles.

39. The article of manufacture of claim 25, wherein computing the color value comprises:

selecting a ray sample according to an importance function;

selecting an environment color from an environment map according to the ray sample;

determining a visibility value according to the selected ray sample;

calculating the BRDF term according to the selected ray sample, a surface normal and an eye ray to a virtual camera;

calculating an intermediate color value according to the environment color, visibility value and BRDF value, divided by a value of the importance function according to the ray sample;

adding the intermediate color value to a sum; and repeating selecting of the ray sample, selecting of the environment color, determining of the visibility term, determining of the BRDF term and calculating of the intermediate color value for each ray sample such that a final value of the sum represents a color value for the point P with surface normal N.

40. The article of manufacture of claim 34, wherein computing a normalized weight of each visible spherical triangle comprises:

selecting a spherical triangle;

looking up a color value in a convolved map generated for the selected triangle at a pixel location determined by the surface normal N and the eye ray;

calculating a weight of the selected triangle as an intensity of the color value;

adding the weight of the selected triangle to a sum;

repeating the looking up of the color value, calculating the triangle weight and adding the triangle weight for each triangle; and dividing each triangle's weight by the sum of the weights of all of the triangles.

41. The article of manufacture of claim 40, wherein calculating the weight of the selected triangle by the sum of the weight for each triangle further comprises:

estimating a value of the visibility term over the selected triangle; and scaling the weight selected by the estimated value.

42. The article of manufacture of claim 41, wherein estimating the value of the visibility term comprises:

querying a visibility data structure for visibility values of one or more points proximate the point P;

computing a blend of the one or more visibility values; and computing a visibility value for the point P according to the blend of the proximate visibility points.

43. The article of manufacture of claim 25, wherein prior to receiving the request, the method further comprises:

selecting a scene;

casting a predetermined number of rays for each surface point of the scene; and determining a count of a number of rays in a given direction indicated as occluded/unoccluded;

forming a low resolution image according to the count; and storing the low resolution image within a data structure.

44. The article of manufacture of claim 39, wherein calculating the intermediate color value comprises:

computing a product of the BRDF term, the visibility term and the color term;

identifying a region associated with the ray sample;

computing an inverse probability value of the region associated with the ray sample; and computing the initial color value as the computed product divided by the inverse probability value.

45. The article of manufacture of claim 26, wherein generating the importance function comprises:

computing, for each pixel within an environment map, a product of a BRDF term, evaluated in a direction corresponding to the pixel, times an environment map term evaluated in the direction corresponding to the pixel.

46. The article of manufacture of claim 26, wherein selecting ray samples comprises:

subdividing a unit interval into several regions, where a length of each region is equal to a value of an integrand approximation for a pixel times an area subtended by the pixel, divided by a sum of the integrand approximation times an area subtended by each pixel over all pixels;

choosing a point from a unit square;

normalizing a position of the selected point within its subdivided region; and selecting a ray sample according to a direction of the pixel.

47. The article of manufacture of claim 26, wherein selecting ray samples, the method further comprises:

selecting a pixel with probability determined by a value of the integrand approximation multiplied by an area of the pixel;

choosing a random point within the pixel;

mapping the point within the pixel to a sphere such that the map point represents a ray sample; and repeating the choosing of a pixel, choosing of a random point and mapping for each pixel of the environment map.

48. The article of manufacture of claim 25, wherein the light source term of the reflected radiance integral comprises:
a contribution function that depends only on direction, such that the point P is lit by an environment map.

49. An apparatus comprising:
render logic to receive a request to generate a color value of a point P with surface normal N; and
shade logic to compute the color value of the point P using an importance sampling estimator for a reflected radiance integral to select a plurality ray samples for evaluation of the reflected radiance integral at the point P to generate the color value according to a light source term, a visibility term and a bi-directional reflectance distribution function (BRDF) term of the reflected radiance integral.

50. The apparatus of claim 49, wherein the shade logic comprises:
importance function logic to partition a unit hemisphere surrounding the point P into M non-overlapping regions, approximate a value of the integrand of the reflected radiance integral as a piece-wise constant function that is constant over each of the M non-overlapping regions, and use this piece-wise constant approximated value as the importance function.

51. The apparatus of claim 49, wherein the shade logic comprises:
ray sample logic to tessellate an environment map sphere into M non-overlapping spherical triangles, generate a visible triangle list of the non-overlapping spherical triangles on a hemisphere, about the surface normal N for the point P, compute a normalized weight of each visible spherical triangle, and map points from a unit square onto triangles of the hemisphere according to a respective normalized weight of the triangles, such that the mapped points on the hemisphere are used as the selected ray samples.

52. The apparatus of claim 49, wherein the shade logic comprises:
BRDF convolution logic to tessellate a spherical environment map into M non-overlapping spherical triangles, calculate a convolution of each spherical triangle against a surface BRDF, and store each calculated convolution in a map.

53. The apparatus of claim 49, wherein the shade logic comprises:
visibility logic to select a scene, cast a predetermined number of rays for each surface point of the scene, determine a count of a number of rays in a given direction indicated as occluded/unoccluded, form a low resolution image according to the count, and store the low resolution image within a data structure.

54. A system comprising:
a chipset;
a processor coupled to the chipset via a system bus;
a memory coupled to the chipset via a memory bus; and
graphics logic coupled to the chipset, the graphics logic, comprising
rendering logic to receive a request to generate a color value of a point P with surface normal N, and
shading logic to compute the color value of the point P using an importance sampling estimator for a reflected radiance integral to select a plurality ray samples for evaluation of the reflected radiance integral at the point P to generate the color value according to a light source term, a visibility term and a bi-directional reflectance distribution function (BRDF) term of the reflected radiance integral.

55. The system of claim 54, wherein the shade logic comprises:
importance function logic to partition a unit hemisphere surrounding the point P into M non-overlapping regions, approximate a value of the integrand of the reflected radiance integral as a piece-wise constant function that is constant over each of the M non-overlapping regions, and use this piece-wise constant approximated value as the importance function.

56. The system of claim 54, wherein the shade logic comprises:
ray sample logic to tessellate an environment map sphere into M non-overlapping spherical triangles, generate a visible triangle list of the non-overlapping spherical triangles on a hemisphere, about the surface normal N for the point P, compute a normalized weight of each visible spherical triangle, and map points from a unit square onto triangles of the hemisphere according to a respective normalized weight of the triangles, such that the mapped points on the hemisphere are used as the selected ray samples.

57. The system of claim 54, wherein the shade logic comprises:
BRDF convolution logic to tessellate a spherical environment map into M non-overlapping spherical triangles, calculate a convolution of each spherical triangle against a surface BRDF, and store each calculated convolution in a map.

58. The system of claim 54, wherein the shade logic comprises:
visibility logic to select a scene, cast a predetermined number of rays for each surface point of the scene, determine a count of a number of rays in a given direction indicated as occluded/unoccluded, form a low resolution image according to the count, and store the low resolution image within a data structure.

* * * * *